May 31, 1949.  H. G. BUSIGNIES  2,471,408
RADIO OBSTACLE DETECTION APPARATUS
Filed Oct. 8, 1942  3 Sheets-Sheet 1
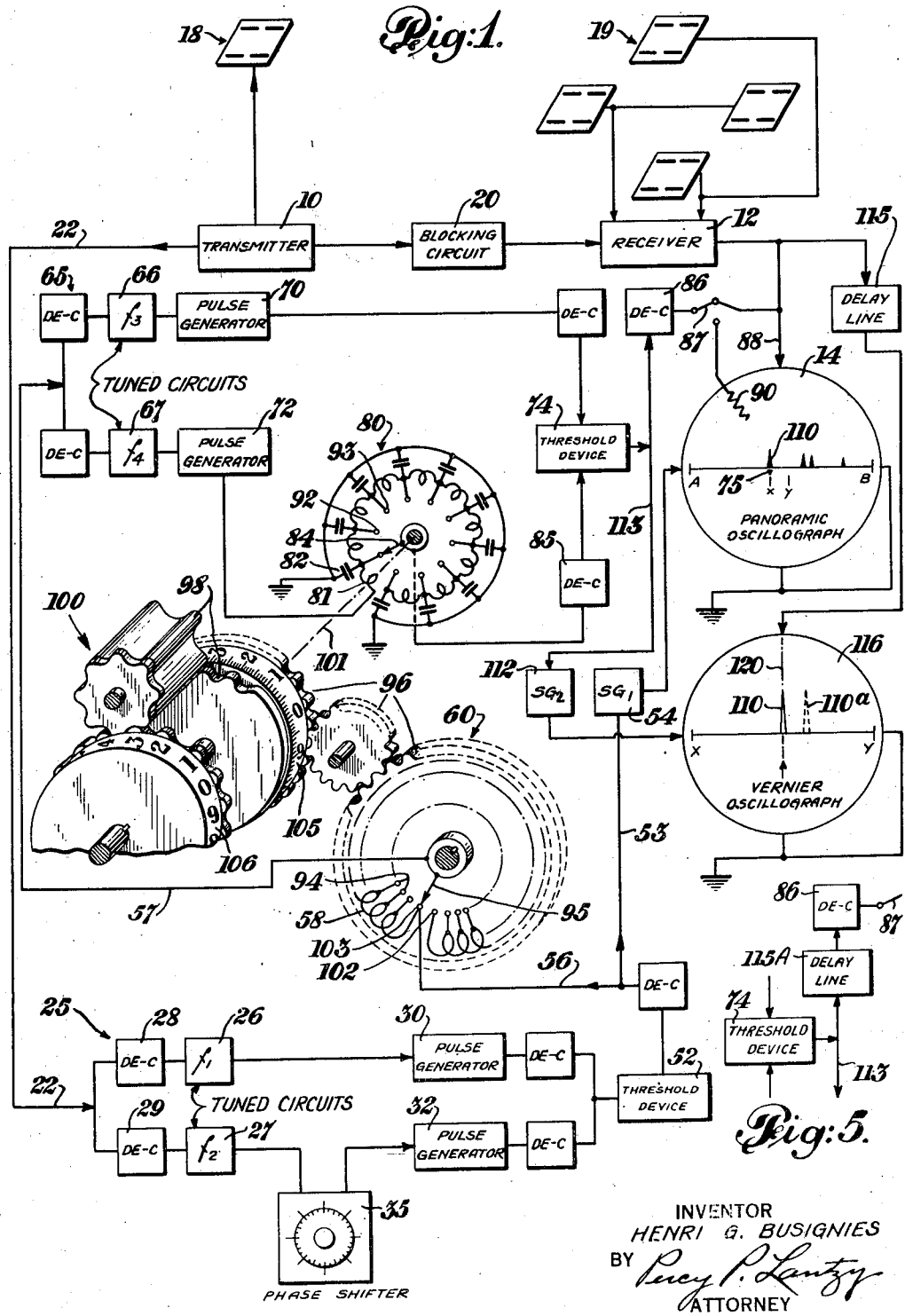
INVENTOR
HENRI G. BUSIGNIES
BY Lucy P. Lantzy
ATTORNEY

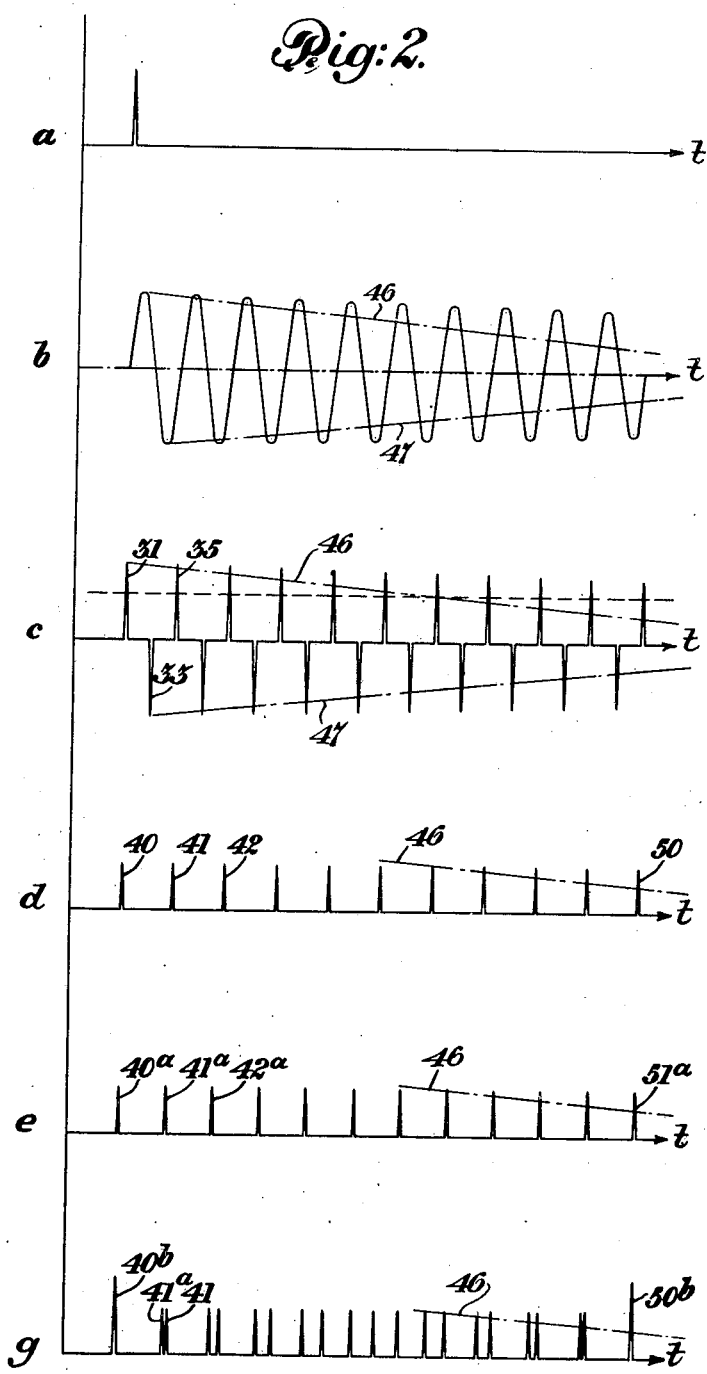

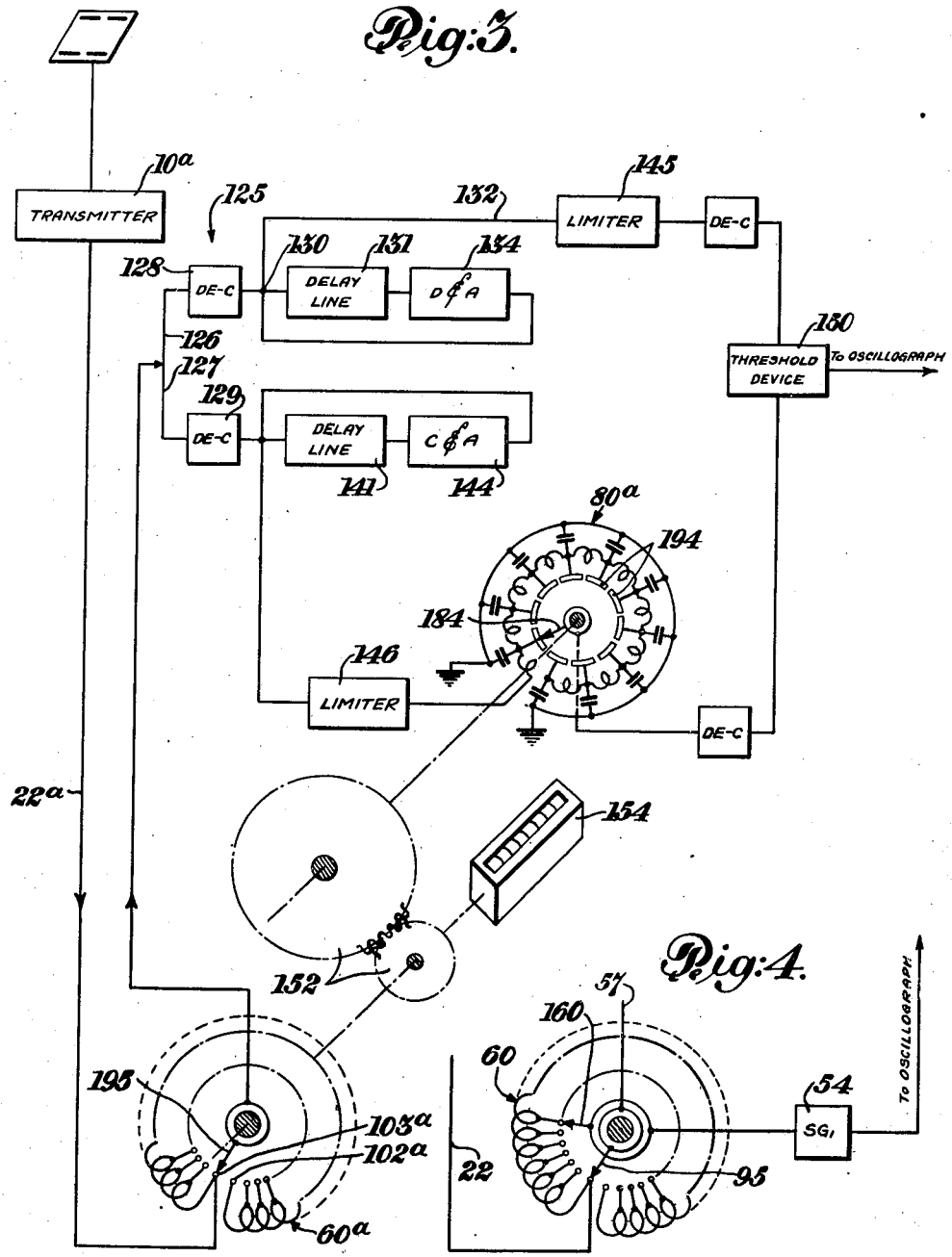

Patented May 31, 1949

2,471,408

UNITED STATES PATENT OFFICE 2,471,408

RADIO OBSTACLE DETECTION APPARATUS

Henri G. Busignies, Forest Hills, N. Y., assignor to Federal Telephone and Radio Corporation, a corporation of Delaware Application October 8, 1942, Serial No. 461,307

20 Claims. (Cl. 343—13)

This invention relates to radio obstacle detection apparatus such as used for detecting hostile aircraft and ships and one of the objects of the invention is to provide a method and means for determining with a high degree of accuracy the distances to obstacles detected by the apparatus.

In my copending application Serial No. 381,640 filed March 4, 1941, I disclose a radio obstacle detection system for use in detecting, identifying and indicating the position and movement of obstacles such as fast moving aircraft. The distance to a detected aircraft, its elevation and azimuth are indicated on one or more cathode ray oscillographs. The detection of obstacles is accomplished by transmitting recurrent signals or electromagnetic impulses which when reflected back by the aircraft or other obstacle are received and indicated by the apparatus as echo pulses. The time interval between the transmission of an impulse and the reception of an echo pulse caused by an obstacle in response to such impulse is used to determine the distance to the obstacle. The echo pulse or pulses, as the case may be, are indicated on a time basis across the oscillograph screen and the distance thereto is determined by using an adjustable local reference indicator movable relative to a zero or other time base.

In another copending application Serial No. 458,191 filed September 14, 1942, I disclose means for providing an accurate pulse calibration for the screen of an oscillograph used in obstacle detection apparatus wherein the calibration is generated in response to transmitted impulses so that the calibration has an accurate time basis regardless of whether or not the transmitted impulses are at a steady or unsteady frequency. While such calibration is accurate, an operator may find it difficult to read the calibration with accuracy since he must interpolate between scale divisions and such interpolation may be further impeded by noise and other effects.

An object of this invention, therefore, is to provide a method and means whereby an operator of an oscillograph can make vernier adjustment of a reference indicator relative to the location of an echo pulse thereby enabling him to obtain an accurate reading from the vernier adjustment of the distance to the obstacle detected.

Another object of the invention is to provide for radio obstacle detection apparatus a method and means for controlling the time base for the trace line of an oscillograph of such apparatus whereby a predetermined portion of the total effective range of the apparatus can be viewed on the oscillograph.

The method of this invention involves generating a reference indicator pulse in synchronism with the transmission of the detector impulse, applying the indicator pulse to a first oscillograph to produce an indicator for movement along the trace line thereof for indicating, by coincidence with an echo of the detector pulse, the distance to the obstacle causing such echo pulse. The energy of the reference pulse is simultaneously used to control the sweep circuit of a second oscillograph so as to magnify on the screen thereof a small part of the total range covered by the first oscillograph. By retarding the energy of the echo pulse a predetermined amount and applying this retarded echo energy to the second oscillograph the echo pulse will be caused to appear in a predetermined position on the screen of the second oscillograph when the reference indicator is in coincidence with the echo pulse on the first oscillograph. This same result may be accomplished by retarding, instead of the echo pulse, the energy of the reference pulse used for controlling the sweep circuit of the second oscillograph.

This method of detection provides for the selection of a pulse appearing upon the first or panoramic oscillograph by moving the reference indicator to approximate coincidence therewith and then detecting by magnification the coincidence of the reference indicator and the echo pulse shown by the positioning of the echo pulse on the second or vernier oscillograph with respect to a mark on the screen thereof.

For a further understanding of the method and forms of apparatus by which the method can be practiced, reference may be had to the following detailed description to be read in connection with the accompanying drawings, in which:

Fig. 1 is a schematic illustration of a radio obstacle detection apparatus in accordance with this invention;

Fig. 2 is a graphical illustration indicating the steps by which a reference indicator or controlling pulse is obtained; and Figs. 3, 4 and 5 are schematic illustrations of additional forms of apparatus of the invention.

Referring to Fig. 1 of the drawings, a form of obstacle detection apparatus is shown by which the methods of this invention may be practiced. The apparatus comprises a transmitter 10, a receiver 12 and a panoramic oscillograph 14. The transmitter and receiver are provided with antennae 18 and 19 which are mounted for manipulation to permit directive scanning. The transmitter and the receiver are interconnected with the usual blocking circuit 20 whereby the receiver is blocked during the transmission of radio detection impulses. An obstacle detection system of this character is disclosed in my aforesaid copending application Serial No. 381,640 filed March 4, 1941.

The panoramic oscillograph may cover the entire detectable range of the apparatus or it may be arranged to cover a fractional part only thereof. For ranges of the order of 150 miles, for example, a long retardation line would be required to provide adjustment for a reference pulse along that length of range. It is preferable to keep the length of the retardation line to a minimum and therefore I propose to reduce the range of the panoramic oscillograph to a fractional part of the full range, that is ½ or ¼ or 1/10 etc.

As shown in Fig. 1, the pulse energy used for this purpose is supplied from the transmitter 10 simultaneously with transmission of impulses over the connection 22 to a pulse retarding device 25. The device 25 in accordance with one form of the invention comprises two tuned known types of shock excitable circuits 26 and 27 tuned at slightly different frequencies. The pulse energy received over the connection 22 is passed through decouplers 28 and 29 whereupon the energy is adapted to shock excite the tuned circuits 26 and 27. The tuned circuits have high "Q" and when stock excited in known manner oscillate at the frequency to which they are tuned. The decouplers 28 and 29 are known uni-directional devices such, for example, as a buffer tube.

Connected to the tuned circuit 26 is a pulse generator 30 such as diclosed in the copending application of E. Labin and D. Grieg Serial No. 429,376 filed February 3, 1942 patented September 24, 1946, Patent No. 2,408,078. The pulse generation and shaping feature of the pulse generator 30 will be clear from an inspection of Fig. 2. The curve $a$ indicates the pulse energy received from the transmitter 10 and the sinusoidal curve $b$ represents the slightly damped wave trains generated by the tuned circuits 26 and 27. The pulse generator 30 translates the sinusoidal curve received from the tuned circuit 26 into a series of narrow pulses 31, 33, 35 etc. shown by curve $c$, one for each half cycle of the wave train $b$. The generator 30 includes means for shaping and limiting the pulses as disclosed in the aforementioned application Serial No. 429,376, thereby producing uni-directional pulses 40, 41, 42 etc. as indicated by the curve $d$.

A second pulse generator 32 corresponding to the pulse generator 30 is connected through a phase shifter 35 to the tuned circuit 27 whereby a second series of pulses 40$a$, 41$a$, 42$a$ etc. are generated as indicated by the curve $e$. The frequency of the circuit 27 is slightly above the frequency of the circuit 26 so that the second series of pulses will have a beat relationship with the pulses of the curve $d$ as illustrated by curve $g$. In the series of pulses shown by the curves $d$ and $e$, the pulses 40 and 40$a$ are in coincidence thereby providing a beat pulse 40$b$ of large amplitude. The next succeeding pulses 41 and 41$a$ are not in coincidence and, therefore, do not add together. Likewise, the next pulses 42 and 42$a$ are still further apart in time. The frequencies of the two series are such that after a number of pulses of the first series $d$, a pulse 50 would normally have in coincidence therewith a pulse 51$a$ of the series $e$ thereby producing a second beat pulse 50$b$. The wave trains, however, may be so damped that the pulses 50 and 51$a$, when added would not exceed the amplitude of the initial pulses of the two series. The damping of the waves and the resulting amplitude control of the pulses are indicated by the lines 46 and 47 on parts $b$, $c$, $d$, $e$ and $g$ of Fig. 2. The two pulse series $d$ and $e$ are passed through decouplers and combined as indicated at $g$ and then through a known threshold device 52 whereby the lower portion of the pulse energy equal to the amplitude of the pulses 40, 40$a$, etc. is clipped off leaving the peak portion of the pulse 40$b$.

The pulse 40$b$ is used for controlling the sweep circuit of the oscillograph 14. This is accomplished by a connection 53 to a sawtooth generator 54 the output of which is applied to the sweep circuit of the oscillograph 14.

The occurrence of beat pulse 40$b$ may be varied in time by the phase shifter 35 to vary the portion of the total range of the apparatus over which the oscillograph 14 will indicate echo pulses. The phase shifter 35 is quite suitable where the tuned circuits 26 and 27 provide continuous sinusoidal waves in response to the recurring pulse energy from the transmitter 10. Where continuous sinusoidal waves are not produced by the tuned circuits, a delay device such as 60 or 80 may be preferable in the place of the phase shifter 35. A suitable delay device for this purpose is disclosed in the copending application of L. deRosa Serial No. 454,198 filed August 8, 1942, patented November 14, 1944, Patent No. 2,362,470.

By adjusting the phase shifter 35 the oscillograph 14 may be made to cover any desired part such as one-half, one-quarter, or one-tenth etc. of the total range. This may be determined by setting the sweep generator 54.

The beat pulse 40$b$ is also used to provide the time basis for the reference indicator 75 used for determining the distance to an obstacle causing a particular echo pulse. The energy of the pulse 40$b$ passes over a connection 56 to a coil 58 of a vernier delay device 60 the details of which are hereinafter described, and thence over connection 57 to a pulse generating circuit 65. The pulse generating circuit 65 in the form shown in Fig. 1 comprises tuned circuits 66 and 67, pulse generators 70 and 72 together with a threshold device 74 similar to the corresponding parts described in connection with the pulse generating and retarding circuit 25. The operation of the circuit 65 is substantially the same as described for the circuit 25. The two series of pulses produced by the generators 70 and 72 combine in the same manner as illustrated at $d$, $e$ and $g$ of Fig. 2 thereby producing an indicator pulse 75 which corresponds to the pulse 40$b$. In order to move the pulse 75 along the trace line A—B of the oscillograph 14, the beat relationship of the two series of pulses must be varied. This is accomplished by providing a delay network 80 in the circuit containing the pulse generator 72.

The delay device 80 comprises a series of inductance-capacitance sections 81—82. While I have shown 10 such sections, it will be understood that any desired number of sections may be provided as desired. The energy of the pulse series produced by the generator 72 is passed through one or more of the sections depending upon the position of the contacting arm 84. The arm 84 is connected through a decoupler 85 to the threshold device 74 whereupon the energy from the two generators 70 and 72 is combined and the peak pulse forming the reference indicator pulse 75 is produced. The energy of pulse 75 is then passed through a decoupler 86 through a switch 87 to either the deflecting circuit 88 or to a beam intensifying or accelerating control element such as the grid 90. When the pulse energy is applied to the deflecting circuit 88, the indicator pulse 75 is caused to appear at the trace line and to move therealong in accordance with the adjustments of the delay device 80.

When the indicator pulse energy is applied to the beam intensity or accelerating control element, the indicator appears as a dot on the trace line of the oscillograph. This dot, which actually comprises a small part of the trace line, may be more or less brilliant than the trace line or it may be wider or narrower than the trace line. A reference indicator of this character is disclosed in my copending application Serial No. 457,400 filed September 5, 1941, now abandoned.

As the delay device 80 is adjusted from one position to another to include more or less sections 81—82, the timing of pulse addition of the two series of pulses produced by the generator 70 and 72 varies. This will be clear from an inspection of curves d, e and g of Fig. 2. As the arm 84 is advanced from the position shown to the next succeeding contact 92, the time delay applied to the pulses of the curve e, will move the pulse 40a out of coincidence with pulse 40 thereby bringing into alignment with the pulse 41, the pulse 41a. Accordingly, these two pulses will add thereby advancing the indicator pulse one step along the trace line A—B. Should the device 80 be moved to the next succeeding contact 93, the pulses 42 and 42a will be brought into alignment and will add to advance the indicator pulse another step.

In order to make this movement of the indicator smooth, that is to say, by small increments between the steps determined by the pulses 40, 41, 42, etc., I provide a second delay device 60 which includes the delay line or coil 58. This delay coil is provided with a very large number of contacts 94; 100 or more contacts being preferable for fine adjustment. The device 60 is provided with a contact arm 95 which is connected by a gear train 96 including a gear transfer ratio of 1 to 10 such as provided by the Geneva gearing 98 of a counter 100. The counter is in turn connected by a shaft 101 to the shaft upon which the contact arm 84 of the delay device 80 is mounted. For a complete movement of 360° for the arm 95, the arm 84 will be moved from one contact to the next succeeding contact.

It, therefore, follows that the retardation of the pulse energy received through the connection 56 will be retarded according to the adjustment of the arm 95 before it is applied to the pulse generating circuit 65. Therefore, regardless of the position of the arm 84 an adjustment of the delay device 60 will cause the indicator 75 to move between the steps represented by the pulses 40, 41, 42, etc. The Geneva gearing 98 will effect a step movement of the arm 84 whenever the arm 95 moves from the end contact 102 to the starting contact 103 and vice versa. As the arm 95 is moved forwards or backwards along the contacts 94 the reference indicator 75 will be given a corresponding movement along the trace line.

The counting mechanism is provided to provide an easily read indication of the distance to the position of the reference indicator 75 and thus give the distance to a detected obstacle. The first numeral wheel 105 of the counter is, for example, calibrated in 100 divisions while the second numeral wheel 106 is calibrated in tens. Thus for a complete rotation of the numeral wheel 105, the numeral wheel 106 will be moved one step in accordance with the operation of the Geneva gearing 98. Additional numeral wheels may be added together with the usual Geneva gearing whereby the complete rotation of the numeral wheel 106 will cause a third numeral wheel to be advanced one step, and so on. The fine divisions of the wheel 105 may be chosen to represent any desired distance such as 10 yards, for example, and for such calibration, the complete rotation of the wheel 105 will then represent a thousand yards and a complete rotation of the wheel 106 will represent 10,000 yards. The reading on the counter 100, of course, must be added to the reading given by the adjustment of the phase shifter 35. If desired, the adjustment of the phase shifter 35 may be connected into the mechanism of the counter 100 to give directly the total reading.

The panoramic oscillograph 14 thus provided with a reference indicator 75 and associated counter 100 will give a close approximation of the distance to an obstacle causing a particular echo pulse such as the pulse 110.

For more precise determination of the distance to a detected obstacle, I provide a vernier oscillograph 116. The sweep generator 112 for the oscillograph 116 is controlled by energy of the indicator pulse 75 by a connection 113 to the output of the threshold device 74 as is shown in Fig. 1. The sweep generator 112 is adjusted to provide a faster sweep than the sweep generator 54 so that the sweep time X—Y will comprise a small part of the sweep A—B. This will provide for a magnification of the echo pulse 110 as well as the part X—Y. Energy of the echo pulse from the receiver 12 is passed through a delay line 115 before it is applied to the deflecting circuit of the oscillograph 116. The retardation caused by the delay line 115 is such as to provide a time interval equal to one-half of the sweep X—Y so that should the indicator 75 be in exact coincidence with the pulse 110, the pulse 110 will appear at the center screen of the oscillograph 116. Thus, by providing a vertical or other suitable marking 120, on the screen of the oscillograph 116, it will be a simple matter to determine exactly when the indicator 75 is in coincidence with the pulse 110. Should the pulse 110 be to one side of the mark 120 as indicated by 110a, a proper adjustment of the delay device 60 will move the pulse to the solid line position 110. It will thus be a simple matter for an operator to maintain this centered position and thereby furnish for gun or other controls an accurate continuous distance detection.

Referring to Fig. 3 of the drawings, I have shown a modified form of indicator generation and control system wherein the tuned circuits 66 and 67 and the pulse generators 70 and 72 are replaced by a system utilizing delay lines such as disclosed in the aforementioned deRosa application. Tracing the circuit, a pulse is received from the transmitter 10a through the connection 22a to the delay device 60a and thence to the indicator pulse generator circuit 125. The energy of the pulse is divided between the two branch circuits 126 and 127 to decouplers 128 and 129. The energy received through the decoupler 128 is divided at 130 one part being passed over the connection 132 as an initial pulse of a series such as the series shown at d (Fig. 2) and the other part being passed through the delay line 131. The delay line retards the pulse energy introduced therein a predetermined time interval after which it flows through a decoupling amplifier 134 back to the connection 130. This retarded pulse energy is again divided, one part passing over connection 132, as a second pulse in the series d, and the other part re-entering the delay line 131. This process continues until a series of pulses such as the pulses 40, 41, 42, etc. are produced. The spacing of these pulses is determined by the delay characteristic of the line 131 and may be such as to provide a predetermined number of pulses for occurrence during the sweep interval of the oscillograph.

In like manner, the pulse energy passed through the decoupler 129 of the branch circuit 127 is applied to the delay line 141 and the decoupling amplifier 144 to produce a second series of pulses such as the pulses 40a, 41a, 42a, etc. at e of Fig. 2. The circuits 126 and 127 are provided with limiters 145 and 146 of known type so that these pulses will have a given amplitude. The pulses of the circuit 127 are passed through a delay device 80a and thence to a threshold device 150 whereupon the pulses of the two series are combined in the manner illustrated at g (Fig. 2) and the peak portion of the added pulses segregated to provide an indicator pulse. The delay device 80a effects step movement of the indicator pulse as described in connection with the delay device 80 of Fig. 1. Associated with this delay device is the vernier delay device 60a such as the device 60 of Fig. 1; the two devices 60a and 80a being interconnected by a ratio transmission means such as represented by gears 152. Connected to the shaft of the device 60a is a counter 154. Where the transmission ratio is effected gradually as indicated by gears 152, the arm 184 and contacts 194 are constructed to effect step connection when the arm 195 moves from one to the other of the end contacts 102a and 103a.

It will be understood that while two delay lines 131, 141 have been shown in the indicator generator 125, the generator may be provided with one delay line 131 in one branch circuit and a tuned circuit and generator arrangement such as 67 and 72 of Fig. 1 in the other branch circuit.

In Fig. 4 I have shown another means for effecting a selection of the part of the total effective range of the detector apparatus for the panoramic oscillograph 14 of Fig. 1. In the place of the pulse generating and retarding circuit 25, the connection 22 from the transmitter 10 is connected to the coil of the delay device 60 which is provided with a second contact arm 160 connected to the sweep generator 54. Thus for any desired setting of the contact arm 160, the desired retardation of the pulse for controlling the sweep generator 54 can be effected.

In Fig. 5 I show an alternative location for the delay line required to center the echo pulse 110 on the mark 120 of the vernier oscillograph 116 such as when the reference pulse 75 is in coincidence with the echo pulse on the oscillograph 14. In the place of the delay line 115 shown in Fig. 1, I locate a delay line 115A between the threshold device 74 and the decoupler 86 (see Fig. 5). This retards the reference pulse 75 so that when this retardation is offset by an adjustment of the devices 60 and/or 80, as the case may be, the part of the energy pulse delivered to the sweep generator 112 is advanced a time interval equal to the retardation produced by the delay line 115A. This advance thus provides upon coincidence of the echo and reference pulses, the same spread between the point X and the pulse 110 on the oscillograph 116 as is provided for by the delay line 115 in its location shown in Fig. 1.

While I have shown several forms of apparatus by which the methods of this invention may be practiced, it is recognized that many additional forms and variations of those shown may be made without departing from the invention. It will be understood, therefore, that the forms herein shown and described are to be regarded as illustrative of the invention only and not as restricting the appended claims.

What I claim is:

1. A method of determining the distance to an obstacle indicated on the screens of first and second oscillographs by an echo pulse produced by the obstacle in response to a transmitted impulse, comprising generating a reference pulse in timed relation with the transmission of said impulse, applying energy of said reference pulse to the first oscillograph to produce a reference indicator for adjustment along the trace line thereof, applying energy of the reference pulse to control the trace line of the second oscillograph to cover a small part of the range of the first oscillograph at the location of the reference indicator, applying energy of the echo pulse to the second oscillograph, and retarding by a predetermined amount the echo pulse applied to the second oscillograph, so that when the indicator is in coincidence with the echo pulse on the first oscillograph, the echo pulse will appear at a predetermined distance from the start of the trace line on the second oscillograph.

2. A method of detecting the distance to an obstacle detected on the screen of an oscillograph by an echo pulse produced by the obstacle in response to a transmitted impulse, comprising generating in synchronism with the transmission of said impulse two series of pulses, one of said series of pulses being at a given frequency and the second of said series being at a frequency slightly different from said given frequency so that the pulses of the two series beat a given number of pulses apart along one of said series thereby producing an indicator pulse of greater amplitude than the pulses of either series, applying the indicator pulse and the echo pulse to the oscillograph, and effecting movement of the indicator pulse by retarding one of said series of pulses.

3. A method of producing and effecting movement of a reference indicator along the trace line of an oscillograph, comprising generating two series of pulses, one of said series of pulses being at a given frequency and the second of said series being at a frequency slightly different from said given frequency so that the pulses of the two series beat a given number of pulses apart along one of said series thereby producing an indicator pulse of greater amplitude than the pulses of either series, clipping off the energy of the pulses below the amplitude of the pulses of said series to segregate the peak portion of the indicator pulse, applying the indicator pulse thus segregated to the oscillograph for indicator indication at the trace line thereof, and effecting movement of the indicator pulse by retarding one of said series of pulses.

4. The method defined in claim 3 wherein the pulses of the two series are produced by forming wave trains and generating therefrom a unidirectional pulse for each cycle of the wave trains.

5. The method defined in claim 3 wherein the pulses of the two series are generated in response to a singe impulse, the pulses of each of the series being generated by dividing the impulse energy into two parts, one to provide a pulse for the series, retarding the other part thereof to provide a second pulse of the series and repeating the dividing and retardating process for each such retarded part.

6. The method defined in claim 3 wherein the indicator pulse is given a movement on the screen of the oscillograph between the points where change in beat frequency occurs by retarding the energy from which the two series of pulses are generated.

7. In obstacle detection apparatus adapted to transmit an impulse and receive an echo pulse caused in response thereto by an obstacle the location of which is desired; the combination therewith of first and second oscillographs, means to generate a reference pulse in synchronism with the transmission of said impulse, means adjustable to apply energy of the reference pulse to the first oscillograph to produce a reference indicator movable along the trace line thereof, means using the reference pulse to control the sweep circuit of the second oscillograph to cover with the second oscillograph a small part of the range of the first oscillograph at the location of the reference indicator, means to apply energy of the echo pulse to said second oscillograph to produce an echo indication thereon, and means to retard said echo pulse applied to the second oscillograph a predetermined amount so that when said reference indicator is in coincidence with the echo pulse on the first oscillograph the echo pulse indication on the second oscillograph will appear at a predetermined distance from the start of the trace line on the second oscillograph.

8. In obstacle detection apparatus adapted to transmit an impulse and receive an echo pulse caused in response thereto by an obstacle the location of which is desired; the combination therewith of an oscillograph, means adjustable to control the sweep circuit of the oscillograph to cover a small part of the distance range of the apparatus, means to retard energy of the received echo pulse and to apply the retarded energy to said oscillograph so that when the distance represented by the adjustment of said adjustable means is equal to the distance to the obstacle causing the echo pulse, the echo pulse will appear at a predetermined position on the oscillograph.

9. In obstacle detection apparatus adapted to transmit successive impulses and receive the echo pulses caused in response thereto by an obstacle the location of which is desired; the combination therewith of means to generate from a source of energy two series of pulses in synchronism with the transmission of each transmitted impulse, each series of pulses being produced at a frequency greater than the repetition frequency of said transmitted impulses, one of said series of pulses being at a given frequency and the second of said series being at a frequency different from said given frequency so that the pulses of the two series beat a given number of pulses apart along one of said series, thereby producing a reference pulse of greater amplitude than the pulses of either series, means to clip off the portion of the combined energy of the pulse series below the amplitude of the pulses forming the two series, thereby segregating the peak portion of the reference pulse, an oscillograph, means to apply to the oscillograph the reference pulse thus segregated to produce a reference indicator thereon, and means to cause the reference indicator produced by the reference pulse to move along the trace line of the oscillograph.

10. The obstacle detection apparatus defined in claim 9 wherein the means to cause movement of the reference indicator along the trace line comprises means for retarding the energy of one of the series of pulses so that the frequency beat is caused to occur at different numbers of pulses apart.

11. The obstacle detection apparatus defined in claim 9 wherein the means to cause movement of the indicator along the trace line comprises two energy retarding means, one of the retarding means to vary the retardation of the energy of one of said series of pulses so that the frequency beat is caused to occur at different numbers of pulses apart thereby effecting step movement of the reference indicator and the other of the retarding means to vary the energy from which the two series of pulses are generated to effect small increments of movement between said steps.

12. The obstacle detection apparatus defined in claim 9 wherein the means to cause movement of the indicator along the trace line comprises first and second energy retarding means the first retarding means being adjustable through a plurality of cycles to vary the retardation of the energy from which the pulse series are generated to thereby effect small increment movement of the reference indicator, and means to move the second retarding means one step upon movement of said first retarding means from one cycle of adjustment to the other.

13. An oscillograph, means including a source of pulse energy to generate two series of pulses for each pulse of said source, one of said series of pulses being at a given frequency and the second of said series being at a frequency different from said given frequency so that the pulses of the two series beat a given number of pulses apart along one of said series, thereby producing a reference pulse of greater amplitude than the pulses of either series, means to clip off the portion of the combined energy of the pulse series below the amplitude of the pulses forming the two series to segregate the peak portion of the reference pulse, means to apply the reference pulse thus segregated to the oscillograph to produce a reference indicator thereon, means to adjustably retard the energy of one of said series of pulses so that the frequency beat is caused to occur at different numbers of pulses apart thereby causing the reference indicator to move in steps along the trace line of the oscillograph, and means to effect retardation of the pulse energy fed to the pulse generating means thereby effecting movement of the reference indicator between the points where change in beat frequency occurs.

14. The method of determining the distance to an obstacle indicated on the screen of an oscillograph by the delay of an echo pulse produced by the obstacle in response to a transmitted impulse, comprising generating a reference pulse in timed relation with the transmission of said impulse, applying energy of the reference pulse to initiate the trace line sweep of the oscillograph, receiving the echo pulse reflected by the object, retarding the energy of the received echo pulse a predetermined amount, applying the retarded energy of the received echo pulse to the oscillograph to produce an indication thereon, and retarding the reference pulse with respect to the transmitted pulse until the indication produced by said echo pulse appears at a pre-determined distance from the start of the trace line on the oscillograph.

15. In an apparatus for indicating the time spacing between two electromagnetic impulses; the combination therewith of an oscillograph, means controlled by the first of said impulses to initiate the sweep of said oscillograph and to produce a trace line which covers only a small part of the time spacing between said impulses, adjustable means to delay the initiation of said trace line until the occurrence of the second of said impulses, means to retard the energy of the second of said impulses a predetermined amount and to apply the retarded energy to said oscillograph to produce an indication on said trace line at a predetermined distance from the start of said line.

16. In obstacle detection apparatus adapted to transmit an impulse and receive an echo pulse reflected from a distant object; the combination therewith of an oscillograph having a sweep circuit for producing a trace line thereon covering only a fraction of the time interval between the transmission of said pulse and the receipt of the echo pulse from the most distant object to be measured, means generating a control pulse simultaneously with the transmission of said pulse, a connection including adjustable delay means for controlling said sweep circuit by said control pulse, whereby said trace line may be shifted by said adjustable delay means to cover any desired portion of said time interval, a connection from the output of said adjustable delay means for applying energy of said delayed pulse to said oscillograph to produce an indicator thereon, and second adjustable delay means in said second connection for shifting said indicator to different positions along said trace line.

17. Obstacle detection apparatus according to claim 16 and including a second oscillograph having a sweep circuit for producing a trace line thereon covering only a fraction of the interval covered by the trace line of said first oscillograph, and a connection for controlling said sweep circuit by the impulse producing said indicator on said first oscillograph.

18. Obstacle detection apparatus according to claim 17 and including means for applying echo pulse energy to both of said oscillographs to produce echo indications thereon, and delay means for delaying by a predetermined time the application of echo pulse energy to said second oscillograph with respect to the echo energy applied to said first oscillograph.

19. In combination, an oscillograph, means including a source of pulse energy to generate two series of pulses, one of said series of pulses being at a given frequency and the second of said series being at a frequency different from said given frequency so that the pulses of the two series beat a given number of pulses apart along one of said series, thereby producing a reference pulse of greater amplitude than the pulses of either series, said means for generating the two series of pulses comprising two tuned circuits, one for each series, the circuits being tuned at different frequencies to provide wave trains, and means associated with each circuit to generate from the wave trains uni-directional pulses, means to clip off the portion of the combined energy of the pulse series below the amplitude of the pulses forming the two series to segregate the peak portion of the reference pulse, means to apply the reference pulse thus segregated to the oscillograph to produce a reference indicator on the trace thereof. and means to retard one of the series of pulses to cause the reference indicator to move along the trace line.

20. In combination, an oscillograph, means including a source of pulse energy to generate two series of pulses, one of said series of pulses being at a given frequency and the second of said series being at a frequency different from said given frequency so that the pulses of the two series beat a given number of pulses apart along one of said series, thereby producing a reference pulse of greater amplitude than the pulses of either series, said means for generating the two series of pulses comprising two circuits having different energy retarding characteristics, each circuit having a loop arrangement to effect division of pulse energy applied thereto into two parts, one part as a pulse for the series and the other part being retarded by the circuit, and said loop arrangement being adapted to continue the division and retardation for each such retarded part, means to clip off the portion of the combined energy of the pulse series below the amplitude of the pulses forming the two series to segregate the peak portion of the reference pulse, means to apply the reference pulse thus segregated to the oscillograph to produce a reference indicator on the trace thereof, and means to retard one of the series of pulses to cause the reference indicator to move along the trace line.

HENRI G. BUSIGNIES.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,143,035 | Smith | Jan. 10, 1939 |
| 2,171,536 | Bingley | Sept. 5, 1939 |
| 2,221,666 | Wilson | Nov. 12, 1940 |
| 2,227,598 | Lyman et al. | Jan. 7, 1941 |
| 2,243,234 | Von Duhn | May 27, 1941 |
| 2,300,189 | Wolff | Oct. 27, 1942 |
| 2,345,932 | Gould | Apr. 4, 1944 |
| 2,355,363 | Christaldi | Aug. 8, 1944 |
| 2,364,190 | Burgess | Dec. 5, 1944 |
| 2,416,088 | Deerhake | Feb. 18, 1947 |

FOREIGN PATENTS

| Number | Country | Date |
| --- | --- | --- |
| 113,233 | Australia | June 2, 1941 |